(No Model.)

H. STRAW.
SNAP HOOK.

No. 275,537.  Patented Apr. 10, 1883.

WITNESSES:
Chas. Nida
C. Sedgwick

INVENTOR:
H. Straw
BY Munn & Co
ATTORNEYS.

UNITED STATES PATENT OFFICE.

HENRY STRAW, OF GUILFORD, MAINE.

SNAP-HOOK.

SPECIFICATION forming part of Letters Patent No. 275,537, dated April 10, 1883.

Application filed October 16, 1882. (No model.)

*To all whom it may concern:*

Be it known that I, HENRY STRAW, of Guilford, in the county of Piscataquis and State of Maine, have invented a new and Improved Snap-Hook, of which the following is a full, clear, and exact description.

The object of my invention is to provide a new and improved snap-hook which is so constructed that the bolt or plunger cannot be pushed back by the horse, and accidental opening of the snap is thus prevented.

The invention consists in a hook having a tubular shank, containing a sliding bolt, having a stud which passes through an L-shaped slot in the tubular shank. A spring in the tubular shank has its ends in grooves in the inner end of the bolt and the base of the opening in the shank, which spring presses the bolt outward and also turns it toward the transverse arm of the slot, so that when the bolt is pushed outward its stud passes into the transverse arm of the slot, and thus locks the bolt in position.

Reference is to be had to the accompanying drawings, forming part of this specification, in which similar letters of reference indicate corresponding parts in all the figures.

Figure 1:
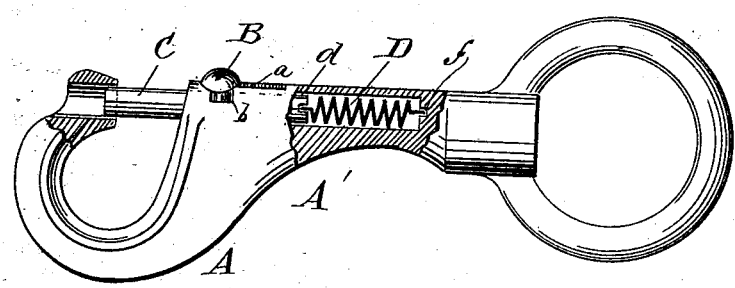
Figure 2:
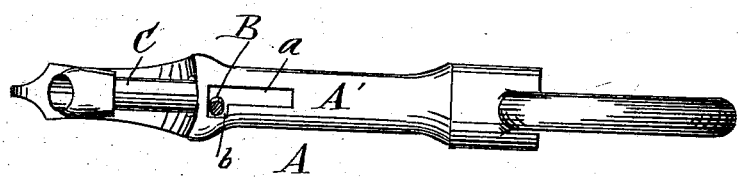
Figure 3:
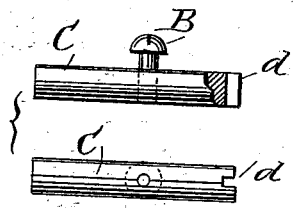

Figure 1 is a longitudinal elevation of my improved snap-hook, parts being broken and other parts shown in section. Fig. 2 is a plan view of the same. Fig. 3 shows the plunger or bolt in side view and plan view, part of the former being broken out and shown in section.

The tubular shank A' of the snap-hook A is provided in its front side with a longitudinal slot, *a*, the upper end of which terminates in a short rectangular slot, *b*. A screw or stud, B, is passed through the said slot into the bolt or plunger C, which is adapted to slide longitudinally in the shank A', and which is pressed outward by a spiral spring, D, in the lower part of the recess or opening in the shank. The inner end of the bolt or plunger C is provided with a transverse groove, *d*, and the base of the opening in the shank is also provided with a transverse groove, *f*. The ends of the spring D are so bent that they can be passed into the said grooves with the spring in torsion, and will turn the bolt on its longitudinal axis in the direction of the transverse slot *b*. If the bolt or plunger is moved outward the pin or stud B will immediately be forced into the slot *b*, as shown in Figs. 1 and 2. The bolt is thus locked in position and cannot be pushed back until the stud B has been moved out of the slot *b*. It will thus be impossible for an animal to push back the bolt or plunger.

My improvement is very simple, and works automatically. As the bolt C passes into the aperture in the end of the hook the end of the said bolt will be held securely and the snap strengthened.

In place of an aperture, the end of the hook can be provided with a recess.

Having thus fully described my invention, I claim as new and desire to secure by Letters Patent—

1. A snap-hook, formed substantially as herein shown and described, provided with a cylindrical hole and an L-shaped slot through the shell thereof, in combination with a bolt adapted to slide longitudinally and to partially rotate in said hole, said bolt being provided with a stud adapted to project through and slide in said slot and to be held by the shoulder formed by the L thereof when partially rotated, as and for the purpose specified.

2. In a snap-hook, the combination, with the tubular hook-shank A', having a slot, *a b*, in its shank, of the bolt C, the stud B, and the spring D, substantially as herein shown and described, and for the purpose set forth.

3. In a snap-hook, the combination, with the tubular hook-shank A', provided with an L-shaped slot, *a b*, and having a groove, *f*, in the base of its recess, of the bolt C, having a groove, *d*, in its inner end, the stud B, passing through the slot *a b* in the bolt, and the spring D, having its ends bent to fit into the grooves *d* and *f*, substantially as herein shown and described, and for the purpose set forth.

HENRY STRAW.

Witnesses:
 DAVID R. STRAW,
 WALTER BENNETT.